Oct. 12, 1948.                    J. H. BOOTH                         2,451,061
                        VARIABLE RATIO STEERING ASSEMBLY
Filed Oct. 27, 1945                                          2 Sheets-Sheet 1

Inventor
James H. Booth

Oct. 12, 1948.    J. H. BOOTH    2,451,061
VARIABLE RATIO STEERING ASSEMBLY
Filed Oct. 27, 1945    2 Sheets-Sheet 2
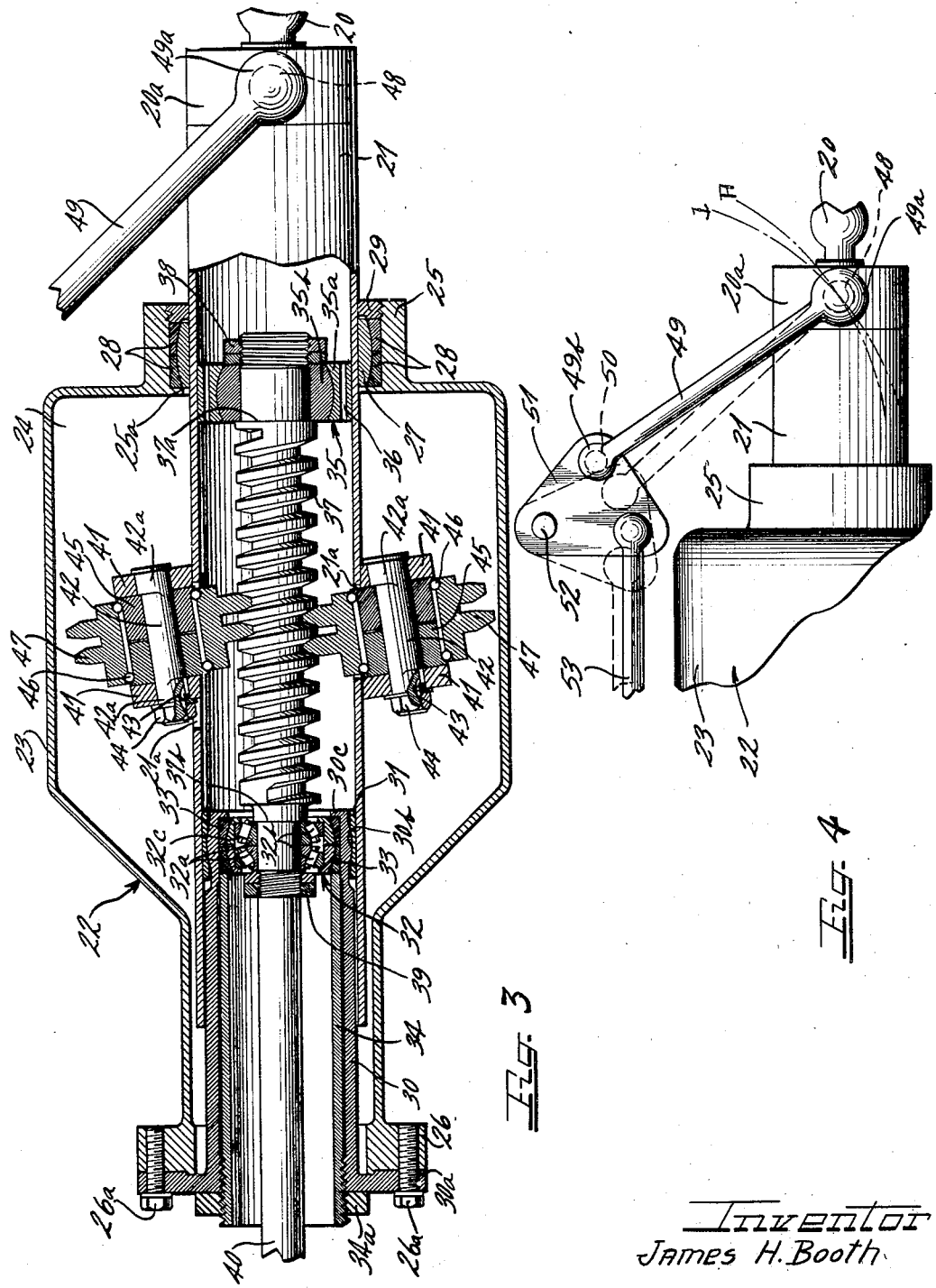
Inventor
James H. Booth Patented Oct. 12, 1948

2,451,061

UNITED STATES PATENT OFFICE 2,451,061

VARIABLE RATIO STEERING ASSEMBLY

James H. Booth, Detroit, Mich., assignor to Thompson Products, Inc., Cleveland, Ohio, a corporation of Ohio Application October 27, 1945, Serial No. 625,092

5 Claims. (Cl. 74—496)

This invention relates to steering mechanisms and the like wherein rotation of a steering wheel reciprocates a slidable part, and wherein reciprocal motion of the slidable part is selectively resolved into rotating motion for steering dirigible wheels or the like.

Specifically, the invention deals with a mechanical movement especially suited for automotive steering assemblies, wherein a rotating part reciprocates a driven part and wherein reciprocal movement of the driven part is resolved into desired rotating movement in amounts determined by the selected position of a control member.

In my copending application, Serial No. 589,039, filed April 18, 1945, now Patent No. 2,417,073, issued March 11, 1947, entitled: "Variable gear ratio steering assembly," of which the present application is a continuation in part, there are described and claimed steering mechanisms wherein a steering shaft reciprocates a pitman arm shaft through a worm and gear arrangement, and wherein the pitman arm shaft controls the swinging movement of a pitman arm to steer dirigible wheels.

The present invention is concerned with improvements for such assemblies that bring about easier operation and better balanced transfer of operating stresses.

In accordance with the present invention, a compact variable ratio steering assembly is provided wherein relatively movable parts are carried on self-aligning bearings that will not transmit bending or twisting loads and at the same time will accommodate misalignment of parts.

Thus, in accordance with the present invention, a casing is provided with opposed open ends and an operating chamber between these open ends. One open end of the casing supports a self-aligning bearing. The other open end of the casing fixedly supports a sleeve which projects into the operating chamber. The inner end of this sleeve carries a self-aligning bearing therearound. A tube is slidably mounted in the self-aligning bearing carried by the first mentioned open end of the casing and on the self-aligning bearing carried around the sleeve. The tube is free to reciprocate on the self-aligning bearings.

Another self-aligning bearing is secured in the sleeve and held therein against axial movement. Still another self-aligning bearing is slidably mounted in the tube. A worm is rotatably supported in the two last-mentioned bearings. The tube rotatably supports diametrically opposed worm followers or gears. These gears are inclined at the same angle as the pitch of the worm so that they will always be in full meshed engagement with the worm. A steering shaft projects through the sleeve to rotate the worm and thereby move the worm follower gears and tube along reciprocal paths relative to the casing.

The tube projects from the casing and has a pitman arm fixedly depending from its projected end. A link is connected to the tube through a ball and socket or other universal joint. This link has a pivot anchor which can be shifted. As the tube is reciprocated, the link will resolve this reciprocal movement into rotating movement, thereby swinging the pitman arm. The degree of resolution of such movement is varied at will by shifting the pivot anchor for the link.

It is, then, an object of the present invention to provide an improved variable ratio steering assembly of the type disclosed and claimed in my copending application Serial 589,039, filed April 18, 1945.

A still further object of the invention is to provide a compact variable ratio steering unit which is easy to operate and which has self-aligning bearings accommodating misalignment of parts.

A further object of the invention is to provide a very small, efficiently operating mechanical movement unit wherein rotation of a driving part reciprocates a driven part, and wherein reciprocal movement of the driven part is resolved into a controlled degree of rotating movement.

Other and further objects of the invention will be apparent to those skilled in the art from the following detailed description of the annexed sheets of drawings which, by way of preferred example only, illustrate one embodiment of the invention.

On the drawings:

Figure 3 is an axial cross-sectional view, with parts in top plan, of the variable ratio steering unit of this invention.

Figure 4 is a fragmentary top plan view of the unit of this invention illustrating somewhat diagrammatically the manner in which the degree of resolution of reciprocal movement into rotating movement is controlled.

As shown on the drawings:

Figure 1:
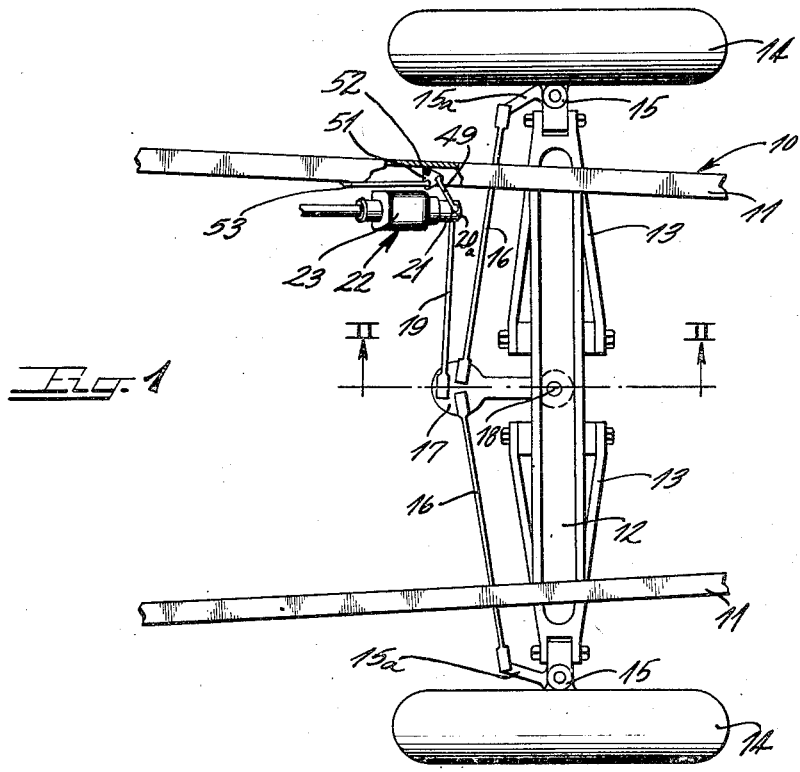
Figure 1 is a fragmentary top plan view, with parts broken away and shown in horizontal cross section, of an automotive vehicle chassis equipped with independently suspended dirigible wheels and a variable ratio steering unit according to this invention.
Figure 2:
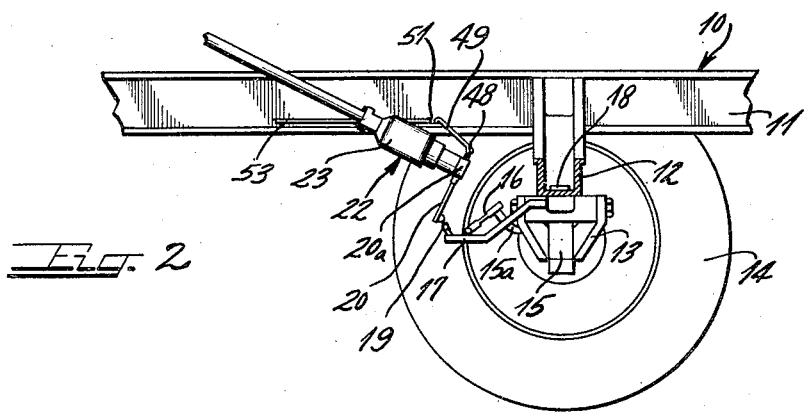
Figure 2 is a vertical cross-sectional view, with parts in elevation, taken substantially along the line II—II of Figure 1.

In Figures 1 and 2, the reference numeral 10 designates generally the chassis of an automotive vehicle. The chassis 10 has side frame beams 11, 11 and a cross beam 12. Independent wheel links or sub-axles, 13, 13 are pivotally supported on the cross beam 12 and dirigible wheels 14, 14 are rotatably mounted on spindles 15, 15 pivotally carried by the sub-axles 13, 13. Each spindle 15 has a steering arm 15a projecting therefrom and these arms 15a are connected through tie rods 16, 16 with a center steering arm 17 that is pivoted to the cross beam 12 by means of a pivot pin 18.

A drag link 19 is also connected to the center steering arm 17. The tie rods 16 are connected to the steering arms 15a through tie rod joints such as ball joints. In addition, the tie rods 16 and drag link 19 have ball and socket joint connections with the center steering arm so that the wheels 14 can rise and fall independently of each other and relative to the cross beam 12.

The drag link 19 is connected through a ball and socket joint to the lower end of a pitman arm 20. This pitman arm 20 has an eye end or hub 20a fixedly secured to the pitman arm shaft 21 of the variable ratio steering unit 22 of this invention.

As best shown in Figure 3, the unit 22 includes a casing 23 defining an operating chamber 24. This casing 23 is adapted to be fixedly mounted on a side frame beam 11 of the automotive chassis 10 shown in Figures 1 and 2. The casing has open ends with a collar 25 projecting from one open end thereof and with a flange 26 on the other open end thereof. The openings in the ends of the casing are aligned.

A first bearing 27 is mounted in the collar 25 on concave supporting rings 28 which permit the bearing 27 to tilt. A self-aligning bearing is thus provided. The rings 28 are clamped between a shoulder 25a at the inner end of the collar 25 and a clamping nut 29 threaded into the outer end of the collar.

A flanged sleeve 30 projects into the other open end of the casing 23 and has its flanged end 30a thereof affixed to the flange 26 by means of bolts 26a. The inner end of the sleeve 30 extends into the operating chamber 24 and has a rounded convex peripheral portion 30b tiltably receiving a second bearing 31.

The pitman arm shaft 21 is in the form of a hollow tube and is slidably mounted in the bearing 27 and on the bearing 31. Thus the bearing 27 surrounds the outside of the tube while the bearing 31 is inside of the tube.

A third bearing 32, preferably in the form of a self-aligning anti-friction roller bearing, is mounted in the sleeve 30 at the inner end thereof. The bearing 32 includes inner race rings 32a surrounded by roller bearings 32b in outer race rings 32c having a spherically convex outer peripheral portion seated in concave rings 33. These concave rings 33 are bottomed on an inturned flange 30c at the inner end of the sleeve 30 and are secured against axial movement in the sleeve by a tube 34 which is threaded into the outer end of the sleeve 30 and held in fixed relation therewith by means of a locking nut 34a. The bearing 32 is thus held against axial movement relative to the tube 30 but can tilt relative to the tube.

A fourth bearing 35 is slidably mounted in the tube 21 in spaced opposed relation from the bearing 32 and includes a ring 35a having a cylindrical outer periphery slidably engaging the inner cylindrical surface of the tube 21 together with a ball member 35b rockably seated on the concave inner surface of the ring 35a. The bearing 35 is therefore self-aligning. Passages such as 36 are provided through the ring 35a to equalize the pressure on opposite sides of the ring as the tube 21 is reciprocated.

A worm 37 is carried in the bearings 32 and 35 and is held against axial movement relative to the bearings by means of nuts 38 engaging the bearing part 35b together with nuts 39 engaging the bearing 32a. Shoulders 37a and 37b on the ends of the worm are bottomed on the bearing parts 35b and 32a respectively so that the bearings are clamped against axial movement relative to the worm. Since the bearing 32 is also clamped against axial movement relative to the sleeve 30, the worm is restrained against axial movements and can only rotate in the casing 23.

A steering shaft 40 extends from the worm 37 through the sleeve 30 and tube 34 and is integral with the worm or directly coupled therewith.

The pitman arm shaft or tube 21 has apertures 21a on diametrically opposed sides thereof in the operating chamber 24. Lugs or ears 41 are welded or otherwise fixedly secured to the tube 21 alongside of the apertures 21a. These lugs 41 carry pins or axles 42 having eccentric end portions 42a seated in bearing engagement in apertures in the lugs. Rotation of the pins will therefore shift them toward and away from the tube 21. The pins are fixedly locked in adjusted non-rotatable relation relative to the lugs 41 by means of keys 43 which fit into grooves provided in one of the lugs of each pair and also fit into key slots in the end of each pin. A nut 44 on each pin holds the key 43 in the selected groove and slot. The arrangement is such that the nut can be loosened, the key removed, the pin rotated to eccentrically shift its axis to the desired position, the key reinserted in aligned grooves and slots of the ear and pin respectively, and the nut tightened to hold the pin in its set position for a purpose to be hereinafter described.

Inner race rings 45 are mounted around the pin between the lugs 41 and provide raceways for ball bearings 46 rotatably receiving therearound worm followers or gears 47. The followers 47 rotate freely around the race rings 45 on the ball bearings 46.

The lugs 41 carry the pins 42 in inclined relation to the tube 21 so that the followers 47 will be pitched to the same inclination as the teeth of the worm 37. The followers 47 project through the apertures 21a and have teeth therearound meshing with the worm 37 as shown. The inclined cam followers will have their peripheral teeth engaging the worm teeth at the pitch angle of the worm. In the event of wear between the engaging teeth, the pins 42 can be rotated and their eccentric ends 42a will shift the pins to move the followers 47 toward the worm thereby taking up wear between the parts and preventing looseness.

When the shaft 40 is rotated to rotate the worm 37, the worm followers 47 will be caused to move along the length of the worm to reciprocate the tube 21. Rotation of the shaft 40, therefore, effects reciprocation of the pitman arm shaft or tube 21, and this reciprocation is not interfered with by the steering linkage even though the pitman arm 20 moves with the shaft or tube 21 since the drag link 19 has ball joints at the ends thereof and can readily swing to accommodate the reciprocating movements.

The swinging of the drag link 19 brought about by reciprocation of the pitman arm tube or shaft 21 and the pitman arm 20 is in a fore and aft direction relative to the chassis 10 and will have no steering effect on the wheels 14. The tube 21, as explained above, slides in the bearing 27 and on the bearing 31. At the same time, the tube 21 slides over the bearing 35 since this bearing is fixed against axial movement.

The top of the pitman arm hub 20a has a ball ended stud 42 mounted thereon as indicated in dotted lines in Figures 3 and 4 and as shown in solid lines in Figure 2. A rigid link 49 has a ball socket end 49a receiving the ball end of the stud 48 in universal joint relation. This link 49 has a ball socket end 49b on the other end thereof as best shown in Figure 4. A ball stud 50 mounted on an anchor plate 51 has the ball end thereof seated in this socket 49b. The plate 51 has a fixed pivot 52 anchoring the plate to a side frame beam 11 of the chassis 10 as best shown in Figures 1 and 2. A control rod 53 is also pivoted to the plate 51 to swing the plate about its pivot 52. The control rod 53 extends to within convenient reach of the driver of the automobile and, if desired, can have an operating handle (not shown) on the dashboard of the vehicle, or adjacent the steering column (not shown).

The link 49 is, therefore, connected at its ends through universal joints with one end being secured to the hub 20a of the pitman arm 20 and with the other end being secured to a shiftable anchor plate 51. The link can thus swing in all directions but, being rigid, it cannot elongate or contract.

As the pitman arm shaft or tube 21 is reciprocated to move the pitman arm hub 20a toward and away from the casing 23, the link 49 will resolve this reciprocal movement into rotating movement in an amount depending upon the setting of the plate 51. Thus, as shown in Figure 4, when the plate 51 is in the solid line position and the pitman arm hub 20a is reciprocated, the end of the link 49 affixed to the hub 20a will move in the arcuate path A thereby swinging the pitman arm and shifting the drag link 19 to steer the wheels 14. When the plate 51 is swung to the dotted line position, the path of movement of the link 49 will be along the arcuate path B and the pitman arm will wing to a greater extent.

The shifting pivot anchor for the link 49 thereby gives a selective control of the degree of resolution of reciprocal movement into rotating or active steering movement, and a variable ratio steering assembly is provided.

The opposed worm followers 47 and the tube 21 provide a balanced arrangement of gears to efficiently effect sliding of the pitman arm shaft or tube 21 upon rotation of the worm. The self-aligning bearings supporting the tube 21 will prevent binding and transfer of bending stresses. Likewise, the self-aligning bearings that rotatably support the worm will absorb binding movement that would otherwise interfere with free sliding of the tube 21.

From the above descriptions it will be understood that the invention provides an improved compact, balanced, and easy acting variable ratio mechanical movement assembly of the type wherein rotating movement is efficiently transferred into sliding movement, and wherein this sliding movement is selectively resolved into rotating movement. Parts of the assembly are nested or telescoped in each other to reduce the overall size of the assembly.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A steering assembly comprising a casing having open ends and defining an operating chamber therebetween, a first bearing tiltably mounted in one open end of the casing, a sleeve projecting into the other open end of the casing and having a flanged end secured to the casing, a second bearing tiltably mounted on the sleeve in said operating chamber, a tube slidably mounted in the first bearing and on the second bearing and projecting out of the casing beyond the first bearing, a third bearing tiltably mounted in the sleeve, means in said sleeve holding the third bearing against axial movement, a fourth tiltable bearing slidable in the tube, a worm in said tube rotatably carried in the third and fourth bearings, means holding the worm against axial movement relative to the third and fourth bearings, opposed worm gears rotatably mounted on the tube in said operating chamber of the casing and projecting through the tube into meshed engagement with the worm, means for rotating the worm to drive the gears for reciprocating the tube relative to the casing, a pitman arm depending from the tube outside of the casing, and a shiftable control link connected to said tube to selectively translate reciprocal movement of the tube and pitman arm into rotating movement for swinging the pitman arm.

2. In a selective mechanical movement assembly, a tube, a casing slidably supporting said tube, a worm rotatably mounted in said tube, a worm gear rotatably mounted on the tube in meshed engagement with said worm, means for rotating the worm to reciprocate the tube relative to the casing, a lever affixed to the tube and depending therefrom, a link operatively connected to the tube for resolving sliding movement thereof into rotation to thereby swing the lever, and a shiftable pivot anchor for said link to selectively vary the degree of said resolving of movement.

3. A steering unit comprising a casing, a hollow pitman arm shaft slidably mounted in said casing, a worm fixedly mounted for rotation in said hollow shaft, a worm gear rotatably mounted on said hollow shaft in meshed engagement with said worm therein, means for rotating the worm to reciprocate the hollow shaft relative to the casing, a link member operatively connected to the hollow shaft, a pivot anchor for said link member, and means for shifting said pivot anchor, said link resolving reciprocal movement of the hollow shaft into rotative movement and said shiftable pivot anchor for the link determining the degree of said resolution of movement.

4. A selective mechanical movement assembly comprising a slidably mounted tube, an arm mounted on said tube for comovement therewith, a rotatable driver in said tube, means connecting the driver with the tube to reciprocate the tube when the driver is rotated, a link conneced to said tube, and a shiftable anchor for said link, said link resolving reciprocal movement of the tube into rotative movement to swing the arm and the position of said shiftable anchor determining the degree of said resolution.

5. A compact steering unit comprising a casing, a tube in said casing and projecting therefrom, self-aligning bearings in the casing slidably and rotatably mounting the tube in the casing, a worm in the tube, self-aligning bearings in the tube rotatably mounting the worm, means holding the worm against axial movement, means drivingly connecting the worm and tube to reciprocate the tube when the worm is rotated, means for resolving reciprocal movement of the tube into controlled amounts of rotative movement.

JAMES H. BOOTH.

REFERENCES CITED

The following references are of record in the file of this patent:

UNITED STATES PATENTS

| Number | Name | Date |
|---|---|---|
| 31,522 | Andress | Feb. 26, 1861 |
| 1,594,767 | Blaschke | Aug. 3, 1926 |
| 1,920,651 | Mackenzie | Aug. 1, 1933 |
| 2,018,653 | Best | Oct. 29, 1935 |
| 2,030,441 | Ganz | Feb. 11, 1936 |